July 28, 1953 E. H. LAND 2,647,049
PHOTOGRAPHIC ELEMENT FOR COLOR PHOTOGRAPHY AND
A PROCESS OF PRODUCING MULTICOLOR PICTURES
Filed Feb. 25, 1947 2 Sheets-Sheet 1

INVENTOR
Edwin H. Land
BY
Donald L. Brown
Attorney

July 28, 1953  E. H. LAND  2,647,049
PHOTOGRAPHIC ELEMENT FOR COLOR PHOTOGRAPHY AND
A PROCESS OF PRODUCING MULTICOLOR PICTURES
Filed Feb. 25, 1947  2 Sheets-Sheet 2

INVENTOR
Edwin H. Land
BY Donald L. Brown
Attorney

Patented July 28, 1953

2,647,049

UNITED STATES PATENT OFFICE 2,647,049

PHOTOGRAPHIC ELEMENT FOR COLOR PHOTOGRAPHY AND A PROCESS OF PRODUCING MULTICOLOR PICTURES

Edwin H. Land, Cambridge, Mass., assignor to Polaroid Corporation, Cambridge, Mass., a corporation of Delaware Application February 25, 1947, Serial No. 730,661

7 Claims. (Cl. 95—2)

This invention relates to color photography and more particularly to novel photographic processes and novel composite photographic film units for use with such processes.

In my copending application, Serial No. 702,039, filed October 8, 1946, for Photographic Product and Processes, there are disclosed novel photographic processes whereby a positive secondary dye image may be obtained from a photosensitive layer containing a latent or developed negative image, by utilizing the differential effect created by said photosensitive layer on a substance which is usable in forming said positive secondary dye images to control the amount of said substance which is available for creating said positive secondary dye image.

It is a principal object of this invention to provide an improved photographic process wherein a visible positive multicolor image is obtained from a plurality of photosensitive layers containing latent negative images by utilizing the differential effect created by said photosensitive layers on substances usable in forming secondary dye colored component images to control the amount of said substances which is available for creating the component images of said multicolor positive image.

Another object of the present invention is to provide a photographic process wherein a plurality of photosensitive layers containing latent records of the primary colors present in a given colored subject are selectively associated with predetermined substances having the capability of entering into reactions with each of said photosensitive layers to produce a visible secondary dye image on another layer wherein said substances are reacted with material in said photosensitive layers to selectively make portions of said substance incapable of creating said visible effects and the remainder of said substances being used to create said visible effect on said other layer or layers, said visible effects, due to their selective creation, forming positive images.

Another object of the invention is to provide a novel photographic process wherein reagents are reacted with a plurality of layers of photosensitive material containing latent records of the primary colors present in a given subject to cause the development of said latent records and the portions of said reagents which are not reacted by said photosensitive materials during said development reactions are utilized in forming a plurality of registered positive dye images each of which comprises a color complementary to the color recorded in the photosensitive layer from which it is formed.

Another object of the present invention is to provide novel composite photographic film units which contain therewithin most or all of the substances necessary to carry out the above processes and which are especially adaptable for use with such processes.

Other objects of the invention will in part be obvious and will in part appear hereinafter.

The invention accordingly comprises the product possessing the features, properties and the relation of components, and the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings wherein.

In general, this invention relates to novel photographic processes and products for the production of fixed stable positive multicolor images formed from a plurality of latent color record images contained in a plurality of photosensitive layers, the multicolor positive image being formed in or on another layer, or plurality of registered other layers, hereinafter referred to as the image-carrying layer or layers.

My above-mentioned copending application, Serial No. 702,039, discloses a process whereby a record image in a photosensitive layer is used for forming a secondary dye image on an image-carrying layer wherein said other image is reversed in the positive-negative sense with respect to the record image.

The present invention relates to the use of a plurality of record images, each of such images comprising a record of one of the primary colors present in a given colored subject, in forming a plurality of superimposed registered secondary dye images on or in an image-carrying layer or a plurality of registered image-carrying layers, said secondary dye images being reversed in the positive-negative sense with respect to the record image utilized in its formation and being of a secondary color complementary to the primary color recorded by said record image.

The physical embodiments of the present invention shown in Figs. 1 through 5 generally involve composite film units comprising a plurality of photosensitive layers, one or more image-carrying layers, and a liquid-carrying container associated with each of the photosensitive layers, each container being positioned in the film unit so that its liquid composition can be released so as to permit the association of the liquid with at least the surface of its associated photosensitive layer and an image-carrying layer. The liquid composition is preferably viscous and preferably includes at least a portion of the reactive substance and at least includes a solvent therefor.

Figure 1:
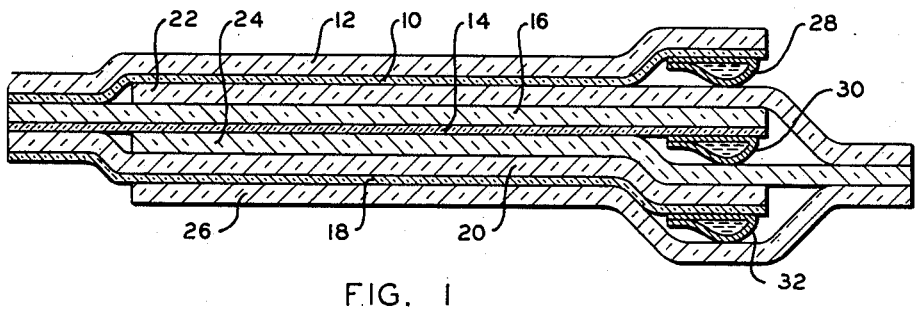
Figure 1 is a diagrammatic cross-sectional view of a composite photographic film unit showing one physical embodiment of the invention.

The film unit of Fig. 1 preferably comprises three photosensitive layers 10, 14, and 18, carried by transparent base layers 12, 16, and 20 respectively, transparent image-carrying layers 22, 24, and 26, and liquid-carrying containers 28, 30, and 32, associated with the photosensitive layers 10, 14 and 18, respectively, the container 28 being positioned to release its liquid between the photosensitive layer 10 and the image-carrying layer 22, the container 30 being positioned to release its liquid between the photosensitive layer 14 and the image-carrying layer 24, and the container 32 being positioned to release its liquid between the photosensitive layer 18 and the image-carrying layer 26.

Figure 2:
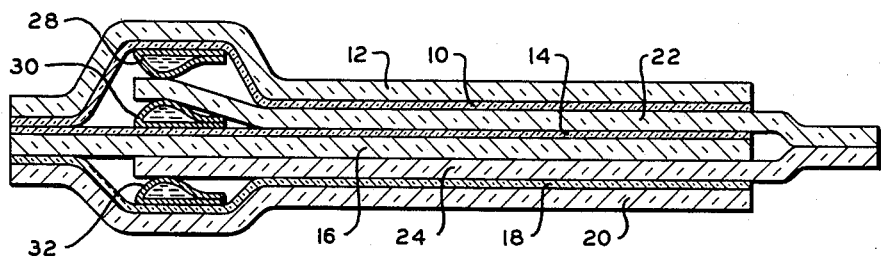
Fig. 2 is a diagrammatic cross-sectional view of a composite photographic film unit showing another physical embodiment of the invention.

The film unit of Fig. 2 preferably comprises three photosensitive layers 10, 14, and 18, carried by transparent base layers 12, 16, and 20 respectively, transparent image-carrying layers 22 and 24, and liquid-carrying containers 28, 30, and 32 associated with the photosensitive layers 10, 14, and 18 respectively, the container 28 being positioned to release its liquid between the photosensitive layer 10 and one surface of the image-carrying layer 22, the container 30 being positioned to release its liquid between the photosensitive layer 14 and the other surface of the image-carrying layer 22, and the container 32 being positioned to release its liquid between the photosensitive layer 18 and the image-carrying layer 24. It will be noted that the film unit disclosed in Fig. 2 differs from that disclosed in Fig. 1 by having one less image-carrying layer and having the photosensitive layers 10 and 14 positioned in the unit so that the secondary dye images formed by the reaction between the liquids contained in containers 28 and 30 and the photosensitive layers 10 and 14 will be formed on or in opposite sides of the single image-carrying layer 22.

Figure 3:
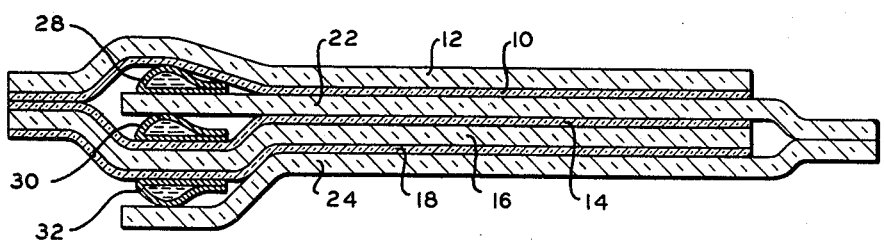
Fig. 3 is a diagrammatic cross-sectional view of a composite photographic film unit showing another physical embodiment of the invention.

The film unit of Fig. 3 preferably comprises a photosensitive layer 10 carried by a transparent base layer 12, photosensitive layers 14 and 18 carried on opposite sides of transparent base layer 16, transparent image-carrying layers 22 and 24, and liquid-carrying containers 28, 30, and 32 associated with the photosensitive layers 10, 14, and 18 respectively, the container 28 being positioned to release its liquid between the photosensitive layer 10 and one surface of the image-carrying layer 22, the container 30 being positioned to release its liquid between the photosensitive layer 14 and the other surface of the image-carrying layer 22, and the container 32 being positioned to release its liquid between the photosensitive layer 18 and the image-carrying layer 24. It will be noted that the film unit disclosed in Fig. 3 differs from those disclosed in Figs. 1 and 2 in that photosensitive layers 14 and 18 are carried on opposite sides of the transparent base layer 16 and that the photosensitive layers 10 and 14 are so positioned in the unit that the secondary dye images formed by the reaction between the liquids contained in containers 28 and 30 and the photosensitive layers 10 and 14 will be formed on or in opposite sides of the single image-carrying layer 22 and that the secondary dye image formed by the reaction between the liquid of container 32 and the photosensitive layer 18 will be formed on or in one surface of the image-carrying layer 24.

The image-carrying layers 22, 24, and 26, some or all of which are included in the embodiments shown in Figs. 1, 2, 3, and 5, are preferably formed of a clear transparent material slightly permeable to water as, for example, hardened gelatin, regenerated cellulose, or polyvinyl alcohol. Photosensitive layer 18, Figs. 1, 2, 3, and 5, preferably comprises a silver halide emulsion sensitive only to the blue region of the visible spectrum; photosensitive layer 14 of Figs. 1, 2, 3, and 5, preferably comprises a silver halide emulsion sensitized substantially to the green region only of the visible spectrum; and photosensitive layer 10 of Figs. 1, 2, 3, and 5, preferably comprises a silver halide emulsion sensitized substantially to the red region only of the visible spectrum. The transparent base layers 12, 16, and 20, some or all of which are included in the embodiments shown in Figs. 1, 2, 3, and 5, may be formed of any conventional base material for photographic film as, for example, cellulose acetate or cellulose nitrate.

Each of the film units of Figs. 1, 2, 3, and 5, may be processed by the application thereto of a single mechanical stress to cause the release of the liquid composition from the containers 28, 30, and 32 and the spreading thereof between adjacent photosensitive layers and image-carrying layers, thus making possible the processing of the film unit either within a hand-held camera or by enclosing the units in an envelope opaque to actinic light as the result of ejection of the unit from a hand-held camera.

Preferably, the composite film units of Figs. 1, 2, 3, and 5, will be exposed in a camera but it will be understood that they may be exposed by other methods well-known in the art. Each of the composite units of Figs. 1, 2, 3, and 5, will preferably be exposed by passing the light through said units in such a direction that first photosensitive layer 18 will be exposed followed by photosensitive layer 14 and lastly by photosensitive layer 10. Inasmuch as the photosensitive layer 18 is sensitive to blue light only, the layer 14 sensitive to green light, and the layer 10 sensitive to red light, an exposure made as described above will result in a blue separation negative, a green separation negative, and a red separation negative.

Inasmuch as most methods of sensitizing silver halide emulsion to green light and to red light do not render those emulsions completely insensitive to blue light it may be necessary to incorporate a light barrier between the photosensitive layer 18 and the other two photosensitive layers which will absorb substantially all blue actinic light. Such a light barrier may be formed by incorporating a yellow dye in the transparent base layer 20 of Fig. 1 and in the transparent base layer 16 of Figs. 2, 3, and 5.

After any of the composite film units of Figs. 1, 2, and 3 have been exposed so that the photosensitive layers 10, 14, and 18 have formed therein latent color separation negatives of a predetermined colored subject, the film unit is processed by applying a mechanical stress thereto as, for example, by drawing the unit between a pair of pressure rollers to cause the liquid-carrying containers 28, 30, and 32 to release the liquid compositions which they contain and to spread said contained liquid in a thin even coating between the photosensitive layer with which each container is associated and the side of the adjacent image-carrying layer. For example, when the composite film unit of Fig. 1 is processed, the liquid composition from container 28 will be spread between the photosensitive layer 10 and the image-carrying layer 22, the liquid composition from container 30 will be spread between photosensitive layer 14 and image-carrying layer 24, and the liquid composition from container 32 will be spread between the photosensitive layer 18 and the image-carrying layer 26. When the film unit of Fig. 2 is processed the liquid composition from container 28 will be spread between photosensitive layer 10 and one side of image-carrying layer 22, the liquid composition from container 30 will be spread between photosensitive layer 14 and the other side of image-carrying layer 22, and the liquid composition from container 32 will be spread between the photosensitive layer 18 and the image-carrying layer 24, and the same is true when the film unit of Fig. 3 is processed.

It will thus be seen that the composite film units of Figs. 1, 2, and 3 are adapted to be processed by a single operation, namely that of releasing the fluid contained in the three containers and spreading the same between photosensitive layers and image-carrying layers so that the resultant reactions will give three registered positive dye images which when viewed in their registered positions, after the photosensitive layers and the supporting base layers have been removed from the unit, will give a positive multicolor picture.

Figure 4:
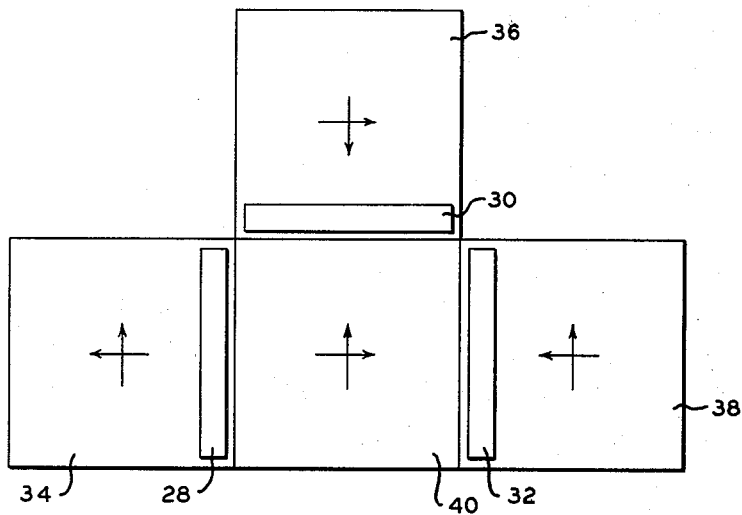
Fig. 4 is a plan view of a composite photographic film unit showing still another physical embodiment of the invention.

The physical embodiment of the present invention shown in Fig. 4 comprises three photosensitive layers 34, 36, and 38 carried by suitable base layers which may be either transparent or opaque, each of which is hingedly attached along one edge to one edge of an image-carrying layer 40 which may be formed from the same transparent material as image-carrying layers 22, 24, and 26 of Fig. 1, or which may be formed from an opaque material as, for example, the material known to the art as baryta paper. Liquid-carrying containers 28, 30, and 32 are mounted on photosensitive layers 34, 36, and 38 respectively, adjacent the edges thereof that are hingedly connected to the image-carrying layer.

The composite film unit of Fig. 4 is adapted to be exposed in a camera known to the art as a tricolor camera capable of simultaneously exposing the three photosensitive layers 34, 36, and 38 to light from a given subject to give a set of color separation negatives of said subject. Inasmuch as it is customary in such cameras to employ filters to give the desired separation negatives it is not necessary that each of the three photosensitive layers be sensitized to different single primary colors. Whereas the composite film unit of Fig. 4 is adapted to be exposed in a tricolor camera it will be understood that a set of color separation negatives may be formed in the photosensitive layers 34, 36, and 38 by other methods well-known in the art as, for example, by means of contact printing or by projection printing.

After the set of latent color separation negatives has been formed in the photosensitive layers 34, 36, and 38, the composite film unit of Fig. 4 is processed by sequentially processing each photosensitive layer in juxtaposition with the image-carrying layer 40 to cause positive secondary dye images to be formed in register with each other in or on said image-carrying layer. This processing is accomplished by first swinging one of said photosensitive layers about its hinged connection to the edge of the image-carrying layer 40 so that said photosensitive layer overlays and is closely adjacent to said image-carrying layer and applying a mechanical stress to the superimposed layers to cause the liquid-carrying container 28 to release its contained liquid and to spread said liquid in a uniform thin layer between the image-carrying layer 40 and the photosensitive layer 34. After the reaction has been completed and a secondary dye image has been formed in the image-carrying layer the photosensitive layer 34 will be removed from the image-carrying layer and severed therefrom along its hinged connection and a second photosensitive layer rotated into juxtaposition with said image-carrying layer and the process repeated to give a second positive dye image after which the second photosensitive layer is removed and the third photosensitive layer processed to give a third secondary dye image after which said third photosensitive layer is removed leaving a multicolor positive image in the image-carrying layer 40.

It will be apparent to those skilled in the art that the color separation negatives must be so located on the photosensitive layers that when they are processed in connection with the image-carrying layer 40 each of the resultant positive dye images will be in register with the other two. It will also be appreciated that in the specific example illustrated in Fig. 4, the latent image formed in photosensitive layer 36 must be rotated through 180° with respect to the latent images in layers 34 and 38 so that a positive dye image formed therefrom will register with images formed from photosensitive layers 34 and 38.

Figure 5:
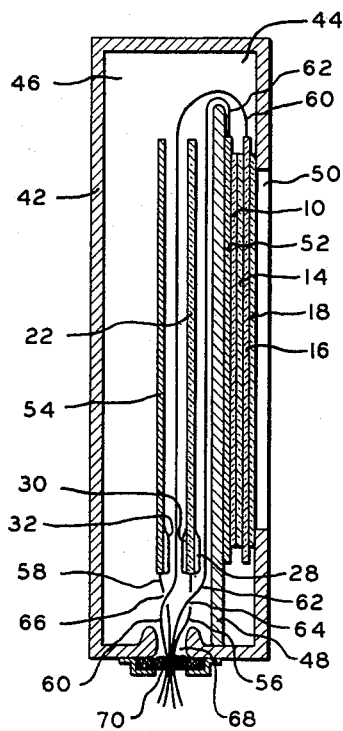
Fig. 5 is a diagrammatic cross-sectional view of a composite photographic film unit and means for holding and processing said unit showing another physical embodiment of the invention.

The physical embodiment of the present invention shown in Fig. 5 comprises a composite film unit enclosed in a housing or receptacle adapted to hold said unit in exposure position in a camera and having mans incorporated therewith adapted to process said composite film unit when the same is drawn from said housing or container. The embodiment of Fig. 5 comprises a housing or receptacle 42 divided into a front compartment 44 and a rear compartment 46, by means of partition member 48, and having an exposure aperture 50 opening into said front compartment 44. Photosensitive layer 10 carried by opaque base layer 52, and photosensitive layers 14 and 18 carried on opposite sides of transparent base layer 16 are positioned in superimposed or stacked relation to each other behind the exposure aperture 50 in the front compartment 44. The total thickness of the photosensitive layers 10, 14, and 18 and the base layers 16 and 52 may be such that the partition 48 will hold them in exposure position behind the exposure aperture 50 or it may be desired to hold said stacked layers in exposure position by means of a spring or other compression means located between the back of the base layer 52 and the partition 48. Transparent image-carrying layer 22 and opaque image-carrying layer 54 are located in the rear compartment 46. Leaders 56 and 58 attached to, or integral with the lower edges of the image-carrying layers 22 and 54, respectively, extend downwardly and pass out through slot 68 and light trap 70 located in the bottom of the rear compartment 46. Leaders 60 and 62 are attached to, or made integral with the upper edges of the base layers 16 and 52, respectively. The leaders 60 and 62 extend upwardly in the front compartment 44, thence rearwardly over the top of the partition 48 and then downwardly, the leader 62 passing between the image-carrying layer 22 and the back of the partition 48, and the leader 60 passing between the image-carrying layers 22 and 54. Slots 64 and 66 are provided in the leaders 56 and 58, respectively. Leader 62 passes through slot 64 and leader 60 passes through slot 66 and both then extend downwardly and pass out of the housing or receptacle through slot 68. Liquid-carrying containers 28 and 30 are attached to both sides of the image-carrying layer 22 adjacent the lower edge thereof. Liquid-carrying container 32 is attached adjacent the lower edge of image-carrying layer 54 and on the side facing leader 60.

After photosensitive layers 10, 14, and 18 have been exposed to cause latent negative images to be formed therein, leaders 60 and 62 are pulled to draw said photosensitive layers from the front compartment 44 into the rear compartment 46 where opaque backing layer 52 will be located adjacent the partition member 48, and photosensitive layer 10 carried by backing layer 52 will be adjacent the front side of image-carrying layer 22, and base layer 16 will be located between image-carrying layer 22 and opaque image-carrying layer 54 and so positioned that photosensitive layer 14 will be adjacent the back surface of image-carrying layer 22, and photosensitive layer 18 will be adjacent the front surface of opaque image-carrying layer 54. All four leaders 56, 58, 60, and 62 are then pulled to draw image-carrying layers 22 and 54, base layers 16 and 52, and photosensitive layers 10, 14, and 18 out of the housing or receptacle through the slot 68 in the bottom of the rear compartment. The edges of slot 68 are spaced apart a distance slightly greater than the total thickness of the image-carrying layers, the base layers, and the photosensitive layers so that as the unit passes through said slot 68 a compressive mechanical stress is applied to the liquid-carrying containers 28, 30, and 32 to cause said containers to release the liquid compositions contained therein and to spread the same in even coatings or layers of predetermined thickness between the respective photosensitive layers and image-carrying layers.

Inasmuch as base layer 52 and image-carrying layer 54 are preferably formed of a material opaque to actinic light, the unit may be drawn from the housing or receptacle without danger of fogging the photosensitive layers 10, 14, and 18 before the reaction with the liquid composition has been completed.

It will be noted that after the base and photosensitive layers of the embodiment shown in Fig. 5 have been drawn from the front compartment into the rear compartment, the arrangement of image-carrying layers, photosensitive layers, base layers, and liquid-carrying containers are substantially the same as the embodiment disclosed in Fig. 3 except that an opaque base layer has been substituted for the base layer 12 of Fig. 3, and an opaque image-carrying layer has been substituted for the image-carrying layer 24. It will be appreciated by those skilled in the art that the embodiment disclosed in Fig. 5 may be modified by incorporating therein the modification shown in Fig. 1 by substituting an opaque image-carrying layer for image-carrying layer 26 and an opaque base layer for base layer 12.

Whereas the modification of Fig. 5 discloses an opaque base layer 52 and an opaque image-carrying layer 54, it will be appreciated by those skilled in the art that these layers may be of transparent material similar to layers 12 and 24, respectively, of the modification shown in Fig. 3 and that such a composite unit could be processed by being drawn from the housing or receptacle into a light-tight envelope, or drawn from said housing or receptacle in a dark room.

The composite film unit shown in Fig. 5 will preferably be provided with an opaque covering, not shown, to cover the exposure aperture 50 so that the unit can be handled in light and inserted in a camera without danger of fogging the photosensitive layers. Preferably, this covering will take the form of a strip of black paper positioned between the aperture and photosensitive layer 18. Also this opaque strip will preferably extend, or will have a leader extending, from the front compartment 44 to the rear compartment 46 and out through slot 68 so that after the unit has been positioned in a camera exposure aperture 50 can be uncovered by drawing the opaque strip out of the housing or receptacle 42.

The liquid compositions carried by the containers 28, 30, and 32 and spread between the photosensitive layers and the image-carrying layer or layers are preferably viscous and preferably comprise solutions of reactive substances which are capable of entering into reactions with the latent image-carrying portions of the material of the photosensitive layers and also of entering into reactions which produce predetermined secondary dyes on or in the respective image-carrying layers, and which are incapable of entering into reactions to form said secondary dyes on or in said image-carrying layers after they have reacted with said latent image-carrying portions.

Inasmuch as the compositions comprising the reactive substances are spread in thin layers or coatings between the photosensitive layers and the image-carrying layers, portions of the reactive substances are reacted with the materials in the photosensitive layers carrying the latent images and are rendered incapable of producing visible effects on the image-carrying layers as the result of these reactions. The extent of the reactions between the substances and the materials in the photosensitive layers preferably varies, from point to point thereof, as a function of the point-to-point degree of exposure creating the latent color separation negative images. There thus remains a distribution of unreacted substances on each photosensitive layer whose capability of creating a visible effect varies in amount from point to point. The unreacted substances then react to form visible secondary dye images in or on the image-carrying layer or layers.

Preferably, at least one of the reactive substances contained in each of the liquid compositions is a developer and when such is the case there are a number of ways of accomplishing the formation of predetermined dyes depending upon the type of developer utilized. In one method there may be provided for reaction with the unreacted portions of the developer a color former capable of coupling with the unreacted, that is unoxidized, portions of the developer to create a color. This color, due to its selective creation, varies in amount from point to point, being a minimum where there was a maximum of development of the latent negative image and being at a maximum where there as a minimum development of the latent negative image. There are thus created on the image-carrying layers or layer positive secondary dye images of the latent negative images in the photosensitive layers.

In another method of forming dye images there are utilized to create colors color formers capable of coupling with oxidized rather than unoxidized portions of the developer. In this case the developer is reacted with the photosensitive materials containing latent negative images to cause a development of each latent negative image resulting in a selective oxidation of the developer and a trapping of the oxidized developer within the developed portions of the photosensitive layers to prevent migration of the oxidized developer from the photosensitive layers. The remainder of the developer is then utilized to create the desired color on the image-carrying layer. In order to form these colors it is necessary to oxidize the unreacted portions of the developer after the selective reaction of the developer with the latent negative images. This oxidation may be accomplished by providing an oxidizing agent on the image-carrying layer in which case the oxidizing agent will preferably be a nonphotosensitive oxidizing agent such as sodium perborate. It is also contemplated to oxidize the unreacted portions of the developer on the image-carrying layer by aerial oxidation. After the developer has been oxidized on the image-carrying layer it is reacted with a suitable color former to cause the creation of a color the concentration and dispersion of which vary from point to point substantially in inverse proportion to the amount of development in corresponding portions of the latent negative image.

In both of the above methods of dye image formation the color former which is reacted with the developer to cause a coupling therebetween is preferably included in solution in the liquid composition. It may, however, be coated on or included in the various photosensitive layers or it may be located on the image-carrying layer or layers in solid form.

In still another method of forming dye images self-coupling developers are used. These developers may be of the type known in the art as direct color-forming developers, that is, developers which couple with themselves when oxidized. They may, however, be of the class of developers which couple with themselves when unoxidized and the pH of the solution is such as to permit self-coupling. In either case the developers are selectively reacted with the photosensitive materials containing latent negative images and the reacted portions are preferably trapped in the photosensitive layers. Then the unreacted portions of the developers are utilized to selectively create colors on the image-carrying layer or layers by oxidizing the unreacted portions of the developers or by adjusting the pH thereof dependent upon the type of developer.

Film units as described above should have certain features in order that they may fulfill the requirements of the process. First, it is preferable that each composite film unit have within its confines all of the materials necessary for the complete processing thereof to produce the final positive multicolor image. Second, the film units should be so designed that they may inherently assure the proper sequence of reactions or can be so used as to assure this proper sequence of reactions.

In the above-described processes it is essential to carry the first reaction, namely, that of reacting the developers with the layers of photosensitive material to selectively render portions of them incapable of creating colors, to substantial completion before the second reaction commences. The proper sequence of the two reactions may be effected by providing the proper physical and/or chemical relationship between the various materials. For example, the oxidizing agent carried by the image-carrying layer may be one which oxidizes the developer more slowly than the developer develops the latent negative image. Another method of assuring proper sequence of reactions comprises the provision of some means for temporarily preventing the color-creating reaction. This means may comprise a coating, of the type disclosed in my above-mentioned copending application, Serial No. 702,039, on the surface of the image-carrying layers covering the oxidizing agent which positively prevents the passage of the developer therethrough until such time as the developer has been selectively reacted by the latent negative image in the photosensitive layer.

Another method contemplates the use of a substance in or on the image-carrying layer which temporarily changes the pH in the neighborhood thereof so as to prevent the color-creating reacting until the development of the latent negative image is completed. The proper sequence of reactions can be assured when a developer is used which couples with itself, or another substance, when oxidized by not putting any oxidizing agent on the various image-carrying layers. Thus, the developer must be oxidized by aerial oxidation before it can couple and this oxidation cannot take place until the photosensitive layers have been separated from the image-carrying layers inasmuch as these two layers when closely pressed together with the liquid composition therebetween, particularly when the liquid is viscous, form a laminate of the film unit which may be only slowly permeable to oxygen and prevents the access of substantially any oxygen to the liquid composition.

In the methods of forming multicolor positive images disclosed above, the developers and, if they are employed, the color-forming couplers, are in solution in the liquid compositon carried by the containers 28, 30, and 32, or are on the image-carrying layer or layers. In another method of forming dye images which may be employed with any of the embodiments shown in Figs. 1 to 5, the color-forming couplers employed may be incorporated in and carried by the photosensitive layers, the amount of color coupler incorporated in each unit area of each of the photosensitive layers being substantially the amount required to couple with the developer oxidized by a fully exposed unit area of one of said photosensitive layers. The molecules of said color couplers have a moderate mobility when dissolved so that unless trapped in the photosensitive layer they will migrate to the image-carrying layer. In such a composite film unit the liquid compositions comprise developers and solvents for the color formers, and they are incapable of creating visble effects constituting positive images in or on the image-carrying layer or layers until modified by a reaction with a photosensitive layer. In processing a composite film unit of this type the liquid composition is spread between the photosensitive layers and the image-carrying layer or layers to permit portions of the developers to react with those portions of the photosensitive layers which contain the latent negative images. The reacted, that is oxidized, portions of the developers are coupled with the color formers present in the photosensitive layers to form relatively immobile dyes, thus trapping the oxidized developers and the color formers in said photosensitive layers. In those portions of the photosensitive layers where all of the developers are not oxidized by latent images there remain portions of the color formers whose capability of creating a visible image varies in amount from point to point. These portions of color formers vary in the photosensitive layers as an inverse function of the point-to-point degree of exposure creating the latent color separation negative images, being at a maximum where there was minimum exposure and being at a minimum where there was maximum exposure. The portions of color formers are dissolved by the solvent in the liquid composition and migrate to the image-carrying layer or layers at which point the developers in the composition are oxidized by means of a suitable nonphotosensitive oxidizing agent as, for example, sodium perborate, and the developers thus oxidized couple with the color formers to form positive secondary dye images in or on the image-carrying layer or layers.

In a further modification, developers, the molecules of which have a moderate mobility when in solution, are incorporated in and carried by the photosensitive layer. The amount of developer incorporated in each unit area of each of the photosensitive layers is no more than enough to be completely exhausted by a fully exposed unit area of one of said photosensitive layers. The liquid compositions include a suitable color former in solution and a solvent for the developers, and they are incapable of creating visible effects constituting positive images in or on the image-carrying layer or layers until modified by a reaction with a photosensitive layer. In processing a composite film unit of this type the liquid composition is spread between the photosensitive layers and the image-carrying layer or layers and the solvents for the developers are imbibed by the photosensitive layers and dissolve the developers therein contained. The developers then react with those portions of the photosensitive layers which contain the latent negative images and the oxidized developers which are the products of this reaction are coupled in the photosensitive layers with a portion of the color formers present in the solution to form relative immobile dyes, thus trapping the oxidized developers and a portion of the color formers in said photosensitive layers. In those portions of the photosensitive layers where all of the developers are not oxidized by the latent images there remain portions of the developers whose capability of coupling with the color couplers varies in amount from point to point as an inverse function of the point-to-point degree of exposure creating the latent color separation negative images. Those portions of developer which are not oxidized migrate to the image-carrying layer or layers, at which point they are oxidized by means of a suitable nonphotosensitive oxidizing agent, as, for example, sodium perborate, and thereafter couple with the color formers to form positive secondary dye images in or on the image-carrying layer or layers.

In a further modification both the developers and the color formers utilized are incorporated in and carried by the photosensitive layers. The molecules of said color couplers and developers have a moderate mobility when dissolved so that unless trapped in the photosensitive layer they will migrate to the image-carrying layer. The amount of developer and coupler incorporated in each unit area of each of the photosensitive layers is no more than enough to be completely exhausted by a fully exposed unit area of one of said photosensitive layers. In such a composite film unit the liquid compositions include solvents for both the developers and color formers, and they are incapable of creating visible effects constituting positive images in or on the image-carrying layer or layers until modified by a reaction with a photosensitive layer. In processing such a composite film unit the liquid composition is spread between the photosensitive layers and the image-carrying layer or layers and the solvents contained therein dissolve the developers and color formers. Portions of the dissolved developers react with the latent images contained in the photosensitive layers and the developer oxidized by this reaction couples with the color former to form relatively immobile dyes, thus trapping the oxidized developer and a portion of the color former in the photosensitive layer. The unreacted developers and the remaining color formers which vary in amount from point to point as an inverse function of the point-to-point degree of exposure creating the latent color separation negative images migrate to the image-carrying layer or layers where the developers are oxidized by a suitable oxidizing agent and the oxidized developers couple with the color formers to form positive secondary dye images in or on the image-carrying layer or layers.

In the three last-described composite film units wherein the developers and/or color formers utilized are incorporated in and carried by the photosensitive layers the desired sequence of reactions automatically takes place without the provision of a coating layer or layers over the oxidizing agent on the image-carrying layer or layers. This is because when they are located within the photosensitive layers the reaction involving the development of the latent negative images in said photosensitive layers and coupling of the oxidized developer with the coupler will be completed before any substantial amount of the developers have an opportunity to migrate to the image-carrying layer or layers.

It will be understood by those skilled in the art that the oxidation of the unreacted developers in the three last-described composite film units may be accomplished by aerial oxidation in the manner described above instead of through the use of an oxidizing agent on the image-carrying layer or layers.

An advantage of the last-mentioned method of forming multi-color images wherein the required developers and/or color formers are incorporated in the photosensitive layers is that in processing such a composite film unit the thickness of the layers of liquid composition spread between the photosensitive layers and the image-carrying layer or layers is not critical. In those methods where the developers and color formers are contained in the liquid compositions it is necessary that the liquid compositions be spread to such a thickness that each unit area thereof contains an amount of developer and/or color coupler which is substantially the amount required to completely develop and to be completely exhausted by a fully exposed unit area of one of said photosensitive areas. When the correct amount of developer and/or color coupler is located in the photosensitive material it is only necessary to spread a sufficient quantity of liquid composition thereover to provide enough solvent to dissolve all of the developer and/or color coupler.

In the above discussion of the process applicable to Figs. 1 through 5 it was specified that image-carrying layers 22, 24 and 26 were preferably formed of a clear transparent material slightly permeable to water as, for example, hardened gelatin, regenerated cellulose or polyvinyl alcohol, that base layers 12, 16 and 20 preferably were formed from a clear transparent material such as cellulose acetate or cellulose nitrate, that the image-carrying layer 40 of Fig. 4 can either be formed of the same material as image-carrying layers 22, 24 and 26 or may be formed from an opaque material such as baryta paper, that the base layers supporting photosensitive layers 34, 36, and 38 of Fig. 4 may either be transparent or opaque, that image-carrying layer 54 of Fig. 5 is preferably formed of an opaque material as, for example, baryta paper having a black backing layer or coating to prevent the transmission of any actinic light, that base layer 52 of Fig. 5 is preferably formed of opaque material as, for example, black paper or a lamination of the conventional transparent film base and a material opaque to actinic light, and that the photosensitive layers 10, 14 and 18 preferably comprised a silver halide emulsion sensitive only to red, green, and blue light, respectively, but no mention was made of the preferred materials comprising the liquid compositions carried by the liquid-carrying containers 28, 30 and 32.

An example of a preferred liquid composition to be carried by the container 28 in any of the embodiments shown in Figs. 1 through 5 for use with an image-carrying layer and blue sensitive photosensitive layer 18 to form a positive yellow dye image on said image-carrying layer comprises:

|  | Grams |
|---|---|
| Diethylparaphenylenediamine hydrochloride | .75 |
| Sodium sulphite | 1.5 |
| Potassium bromide | .6 |
| 5% water solution of sodium carboxymethyl cellulose | 131 |
| Sodium carbonate | 14.62 |
| Ethyl acetoacetic acid (color former) | .1 |

An example of a preferred liquid composition adapted to be carried by the container 30 in any of the embodiments shown in Figs. 1 to 5 for use with an image-carrying layer and green-sensitive photosensitive layer 14 to form a positive magenta dye image on said image-carrying layer comprises:

|  | Grams |
|---|---|
| Diethylparaphenylenediamine hydrochloride | .75 |
| Sodium sulphite | 1.5 |
| Potassium bromide | .6 |
| 5% water solution of sodium carboxymethyl cellulose | 131 |
| Sodium carbonate | 14.62 |
| p-Nitrophenylacetonitrile (color former) | .1 |

An example of a preferred liquid composition adapted to be carried by the container 32 in any of the embodiments shown in Figs. 1 to 5 for use with an image-carrying layer and red-sensitive photosensitive layer 10 to form a positive cyan dye image on said image-carrying layer comprises:

|  | Grams |
|---|---|
| Diethylparaphenylenediamine hydrochloride | .75 |
| Sodium sulphite | 1.5 |
| Potassium bromide | .6 |
| 5% water solution of sodium carboxymethyl cellulose | 131 |
| Sodium carbonate | 14.62 |
| 2,4-dichloro-1-naphthol (color former) | .1 |

If desired the color couplers and/or the developers included in the above liquid compositions, or similar developers and color formers compatible with silver halide emulsions, can be incorporated in the photosensitive layers that they are adapted to react with, in which case the liquid compositions carried by the containers 28, 30, and 32 will comprise the above compositions less the developers and/or color formers.

When the above liquid compositions are employed, that is when the developer and color formers are included in solution in the liquid composition, or when either or both of them are incorporated in the photosensitive layers, the image-receiving surfaces of the image-carrying layers may be swabbed with a 10% solution of sodium perborate to provide an oxidizing agent to oxidize the developer which does not react with the photosensitive layers. If it is desired to omit the oxidizing agent from the image-carrying layers the unreacted developer may be oxidized by aerial oxidation after it and the color former have migrated to the image-carrying layer.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. The process of forming a positive multicolor image which comprises developing a latent negative image, representative of a color component image, in each of a plurality of photosensitive silver halide emulsion layers with a color-forming developer substantially uniformly distributed, substantially to the exclusion of a silver halide solvent fixer, throughout each said photosensitive layer to provide an imagewise distribution of unreacted developer in each said photosensitive layer, transferring, by imbibition and substantially to the exclusion of silver salts, at least a part of said image-wise distribution of unreacted developer in each said photosensitive layer to print-receiving means adapted to have dye component images carried thereby in superposed and registered relation and comprising at least one image-receiving layer while maintaining each said photosensitive layer, as said imagewise distribution is undergoing transfer, in predeterminedly registered and superposed relation to an image-receiving layer and in such close proximity thereto as to transfer to said image-receiving layer for reception thereby a depthwise diffusion of liquid without appreciably disturbing the imagewise distribution of developer contained in said transferred liquid, and reacting developer transferred from each said photosensitive layer to an image-receiving layer to form a dye in the image-receiving layer which receives said transferred liquid whereby to provide a plurality of registered color component images which together form said positive multicolor image, each said dye image being formed in an image-receiving layer which is substantially free of transferred silver so that each said dye image is readily visible.

2. The process of forming a positive multicolor image as set forth in claim 1 wherein each photosensitive layer is separated from an image-receiving layer in superposed relationship therewith at some stage of said process after the imagewise distribution of unreacted developer has been transferred to said image-receiving layer.

3. The process of forming a positive multicolor image as set forth in claim 1 including the step of substantially concurrently exposing said photosensitive layers to a colored subject.

4. The process as set forth in claim 1 wherein said photosensitive layers are three in number and are, respectively, blue-sensitive, green-sensitive and red-sensitive silver halide emulsions.

5. A photographic product which comprises a plurality of water-permeable layers and including at least two photosensitive silver halide layers, print-receiving means adapted to carry a plurality of dye component images in superposed and registered relation to each other and comprising at least one image-receiving layer for receiving by transfer a positive image of a latent image formed in each photosensitive layer, means interconnecting said photosensitive layers for movement relative to each other and to an image-receiving layer whereby each photosensitive layer is positionable in superposed relation and in relatively close proximity to said image-receiving layer, a plurality of rupturable containers, one container for each photosensitive layer and each container holding at least a liquid solvent for a photographic silver halide developer, each container being individually carried by a layer of said product and being positioned between its respective photosensitive layer and said image-receiving layer when said image-receiving layer and said last-mentioned photosensitive layer are superposed with said container being located between said superposed layers at a position where the container is capable of being fractured and of releasing its liquid content between said superposed photosensive layer and image-receiving layer to at least partially permeate the superposed photosensitive layer and image-receiving layer, a color-forming developer soluble in said liquid positioned in said product in individual association with each photosensitive layer and rendered effective to develop latent image in each said photosensitive layer upon the release of liquid between a photosensitive layer and an image-receiving layer in said superposed relation, the result of development of each photosensitive layer being the formation therein of a differential disposition of unreacted developer which is adapted to be transferred to the image-receiving layer in superposed relation therewith and to effect the formation in said image-receiving layer of a reverse dye image of the subject matter of the latent image in said superposed photosensitive layer, said product also having material which is reactable with said developer for effecting dye formation and which is contained in said product in association with each individual photosensitive layer, at least in a position for contact with liquid which contains unreacted developer in solution and which is transferred to an image-receiving layer in superposed relation to a photosensitive layer.

6. A photographic product as set forth in claim 5 wherein said photosensitive layers and said print-receiving means, including an image-receiving layer in association with each photosensitive layer, are all in superposed relation to each other whereby said photosensitive layers are substantially simultaneously exposable by light directed onto and transmitted through one side of said product.

7. A photographic product as set forth in claim 5 having three photosensitive layers which are, respectively, blue-sensitive, green-sensitive and red-sensitive silver halide emulsions.

EDWIN H. LAND.

References Cited in the file of this patent

UNITED STATES PATENTS

| Number | Name | Date |
|---|---|---|
| 742,405 | Eichengrun | Oct. 27, 1903 |
| 1,841,653 | Van der Grinten | Jan. 19, 1932 |
| 1,926,620 | Herzog | Sept. 12, 1933 |
| 1,930,291 | Thornton | Oct. 10, 1933 |
| 1,956,230 | Schmidt | Apr. 24, 1934 |
| 2,137,336 | Gaspar | Nov. 22, 1938 |
| 2,165,168 | Hardy | July 4, 1939 |
| 2,172,307 | Gaspar | Sept. 5, 1939 |
| 2,206,126 | Schinzel | July 2, 1940 |
| 2,315,966 | Knott | Apr. 6, 1943 |
| 2,328,034 | Sease et al. | Aug. 31, 1943 |
| 2,342,620 | Woodward | Feb. 22, 1944 |
| 2,350,380 | White | June 6, 1944 |
| 2,352,014 | Rott | June 20, 1944 |
| 2,385,599 | Ball | Sept. 25, 1945 |
| 2,543,181 | Land | Feb. 27, 1951 |

FOREIGN PATENTS

| Number | Country | Date |
|---|---|---|
| 108,728 | Switzerland | Oct. 10, 1923 |
| 357,625 | Great Britain | Sept. 21, 1931 |
| 503,824 | Great Britain | Apr. 11, 1939 |
| 503,873 | Great Britain | Apr. 17, 1939 |
| 879,995 | France | Dec. 10, 1942 |
| 900,266 | France | Sept. 25, 1944 |
| 53,515 | France | July 16, 1945 |
| | (Addition to No. 873,507) | |